United States Patent [19]

Bostian

[11] 4,127,642

[45] Nov. 28, 1978

[54] PRODUCTION OF SODIUM DITHIONITE FROM SULFUR DIOXIDE, SODIUM FORMATE, AND SODIUM CARBONATE WITH MINIMUM QUANTITIES OF WATER AND METHANOL

[75] Inventor: Logan C. Bostian, Virginia Beach, Va.

[73] Assignee: Virginia Chemicals Inc., Portsmouth, Va.

[21] Appl. No.: 885,456

[22] Filed: Mar. 10, 1978

Related U.S. Application Data

[63] Continuation-in-part of Ser. No. 699,462, Jun. 24, 1976, abandoned.

[51] Int. Cl.$^2$ ............................................. C01B 17/66
[52] U.S. Cl. ..................................................... 423/515
[58] Field of Search ......................................... 423/515

[56] References Cited

U.S. PATENT DOCUMENTS

| | | | |
|---|---|---|---|
| 3,887,695 | 6/1975 | Plentovich et al. | 423/515 |
| 3,897,544 | 7/1975 | Maeda et al. | 423/515 |
| 3,917,807 | 11/1975 | Yasue et al. | 423/515 |
| 3,927,190 | 12/1975 | Yoshikawa et al. | 423/515 |

*Primary Examiner*—O. R. Vertiz
*Assistant Examiner*—Thomas W. Roy

*Attorney, Agent, or Firm*—Depaoli & O'Brien

[57] ABSTRACT

A convenient batch process for producing anhydrous sodium dithionite at high productivity by reduction of sulfur dioxide with formate ion in aqueous methanolic solution is described in which sodium carbonate, in the form of a dry powder, is the source of alkali. Minimum amounts of water, in which sodium formate is dissolved, and of methanol, in which sulfur dioxide is dissolved, are used. In one aspect, $SO_2$-methanol solution, aqueous sodium formate solution, and powdered sodium carbonate are added to a methanol puddle solution, obtained from a preceding run which contains methyl formate in an equilibrium amount which is usually 4–8%, according to specific schedules which are proportioned to the rate of solution of sodium carbonate in the aqueous methanolic solvent and to the rates of reaction of sulfur dioxide with sodium carbonate and with sodium formate to form sodium metabisulfite. The process has a productivity, measurable as pounds of anhydrous sodium dithionite produced per gallon of reactor volume per hour, that is at least as high as the optimum productivity of the process of U.S. Pat. No. 3,887,695, without requiring hazardous dissolving temperatures and possibilities of freeze-up in supply pipes from slight drops in temperatures.

16 Claims, No Drawings

PRODUCTION OF SODIUM DITHIONITE FROM SULFUR DIOXIDE, SODIUM FORMATE, AND SODIUM CARBONATE WITH MINIMUM QUANTITIES OF WATER AND METHANOL

CROSS-REFERENCE TO RELATED APPLICATION

This application is a continuation-in-part of Ser. Number 699,462, filed June 24, 1976, entitled "PRODUCTION OF SODIUM DITHIONITE FROM SULFUR DIOXIDE, SODIUM FORMATE, AND SODIUM CARBONATE WITH MINIMUM SOLVENT" of Logan C. Bostian, which is now abandoned.

BACKGROUND OF THE INVENTION

1. Field of the Invention

This invention relates to the production of anhydrous alkaline metal hydrosulfites or dithionites from formates and sulfur dioxide. It specifically relates to production of sodium dithionite in an aqueous methanolic solution in which both sodium formate and sulfur dioxide are dissolved.

2. Review of the Prior Art

Hydrosulfites, also termed dithionites, are in demand as bleaching agents, such as for bleaching groundwood pulps. Zinc dithionite is being replaced by sodium dithionite because of the shortage and increasing cost of zinc dust to produce zinc dithionite and because of ecological objections to disposal of zinc-containing wastes. Sodium dithionite can be produced by electrolytic and borohydride procedures, but the most economical procedures for making a high-quality solid product increasingly use the formate radical as a means for reducing the valence of the sulfur atom.

This development began with U.S. Pat. No. 2,010,615 which discloses a method for producing anhydrous alkali metal dithionites by introducing gaseous sulfur dioxide into an aqueous methanol solution, which contains sodium formate and sodium carbonate and is held at a temperature below 30° C., and then bringing the $SO_2$-methanol solution to the temperature at which sodium dithionite formation begins. In one Example, $Na_2CO_3$ is 19.0% of sodium formate. This process requires a considerable excess of sodium formate to buffer the acidity of the solution and produces crystals of excessive fineness and low stability.

More than 30 years later, a succession of improvements based on sodium hydroxide as the source of alkali, were disclosed, particularly including U.S. Pat. Nos. 3,411,875; 3,576,598; 3,714,340; 3,718,732; 3,872,221; 3,887,695; 3,897,544; 3,917,807; and 3,927,190; Japanese Pat. Nos. 7003/68 and 2,405/71; and Belgian Pat. No. 698,247.

These improvements comprise adding sulfur dioxidecontaining methanol and an alkaline agent to an aqueous solution of an alkali metal formate and holding the resulting aqueous methanol solution at a reaction temperature above the dehydration point of the hydrated alkali metal dithionite in order to prevent the formation of crystals having water of crystallization occluded therewithin. The rate of addition must generally correspond to the rate of production of dithionite; if too rapid, the dithionite ion decomposes, thus reducing yield. The rate of addition therefore effectively controls productivity, measurable as weight of pure dithionite per unit of reactor volume per hour.

Japanese Pat. No. 7003/68 teaches absorbing sulfur dioxide in methanol to a suitable concentration and then gradually adding, in Example 1, separate aqueous solutions of sodium carbonate (25%) and sodium formate (42%) and, in Example 2, an aqueous alkaline solution (33% total concentration) combining sodium formate and sodium carbonate which is at 33% by weight of the sodium formate. The calculated yield is about 56% based on sulfur dioxide and 53% based on sodium.

U.S. Pat. No. 3,897,544 teaches in its Example 3 the suspension of sodium formate (11.0%) and of sodium carbonate (4.0%) in 80% aqueous methanol solution at 71° C., adding an $SO_2$-methanol solution during 2 hours, and refluxing for an additional 5 hours to obtain anhydrous sodium dithionite, having a purity of 87%, at a yield to sulfur dioxide of 75%.

From the examples showing experimental results in the prior art, it appears that: (a) sodium hydroxide has been routinely selected as the alkali source; (b) sodium carbonate is seldom used but is often mentioned; and (c) in the few available examples in which sodium carbonate is employed as the alkali source, the yield is decidedly inferior to those examples in which sodium hydroxide is used as the alkali source for producing sodium dithionite.

U.S. Pat. Nos. 3,576,598 and 3,887,695 teach absorbing sulfur dioxide in a water-miscible alcohol as a first feed solution, completely dissolving sodium hydroxide and sodium formate outside of the reactor in very hot water (160° C.) as a second feed solution, and feeding these two solutions into a reactor which is held at 60°–90° C. and contains a small amount of the alcohol under superatmospheric pressure. High reactor concentrations are used to obtain high production per unit of reactor volume. U.S. Pat. No. 3,887,695 differs from U.S. Pat. No. 3,576,598 in that the former teaches recycling to the next batch of by-product methyl formate with the methanol as part of the reactant feed solution. The latter patent disclosures a productivity of 0.78 pounds of sodium dithionite production per gallon of reactor volume per hour, and the former patent discloses a productivity of 0.65.

U.S. Pat. No. 3,887,695 discloses a commercially valuable process that is highly advantageous with respect to productivity and simplicity. However, in order to obtain optimum productivity, it is necessary to dissolve all solids, by heating a mixture of water, sodium formate, and sodium hydroxide to a temperature (160° C.) that is critical with respect to saturation and freezing-out of the alkali, and then to transfer the very hot, saturated solution from a dissolving vessel to the reactor. For this reason, the process is subject to difficulties in large-scale industrial production because of freeze-ups within supply pipes to the reactors from slight temperature drops and because of potential hazards from corrosion of equipment by the hot alkali and spraying of hot alkaline solutions upon operating personnel.

One way of minimizing the above difficulties is to compromise on the concentration of the alkaline solution at the cost of lowering the productivity from 0.65 to about 0.475 pounds of pure $Na_2S_2O_4$ per gallon of reactor volume per hour. An improved process for obtaining the optimum productivity of U.S. Pat. No. 3,887,695 while obviating the hazards and the freeze-up difficulties that are inherent in forming and transferring a sodium hydroxide solution at 160° C. is consequently highly desirable from a commercial viewpoint.

SUMMARY OF THE INVENTION

It is accordingly an object of this invention to provide a convenient process for the production of anhydrous alkali metal dithionites from sulfur dioxide and formates in which a highly concentrated alkali metal source is supplied to the reactor without hazards to personnel and/or equipment or freeze-up difficulties.

It is also an object to provide a convenient process for dithionite production having high production per unit of reactor volume per hour.

It is further an object to provide a highly concentrated alkali metal source for production of anhydrous alkali metal dithionites without accompanying superheat with respect to reactor conditions.

It is additionally an object to provide a process wherein a solution of a highly concentrated alkali metal source is provided directly within the reactor from a solid source thereof.

In accordance with the principles and objectives of this invention, a process is accordingly provided for preparing sodium dithionite within a fixed reactor volume by adding to a recipient methanol solution and reacting: (1) sulfur dioxide which is dissolved in methanol, (2) sodium formate which is dissolved in water, and (3) sodium carbonate which is a dry powder. The methanol and the water are at a selected weight ratio, and the water is the minimum amount required for dissolving the sodium formate at maximum concentration and at elevated temperature. This amount of water is insufficient for dissolving the sodium carbonate which at 80° C. can dissolve sufficiently to form a solution of about 31% maximum concentration $Na_2CO_3$, whereas a solution of 42–49% would be necessary to dissolve all of the added $Na_2CO_3$ at one time.

The quantities of sulfur dioxide, methanol, sodium formate, water, and sodium carbonate are preferably adjusted so that the fixed reactor volume is fully utilized. Each methanol solution usually includes about 4–8 percent methyl formate by weight in an equilibrium amount as it is obtained from a previous run. An additional amount of methanol is added to the reflux condenser to minimize loss of methyl formate and other byproducts. This additional amount is about 15 percent of the total methanol used.

The ratio of methanol to water by weight as it is used hereinafter, as a quotient divided by unity, is about 3.0 to about 5.2. The sulfur dioxide-to-methanol ratio on an equivalence basis is about 0.20 to 0.30, preferably 0.24–0.30. On a weight basis, the ratio of sulfur dioxide to water is about 1.7 to about 2.4, the preferred ratio being 1.8–2.2. On an equivalence basis, the ratio of sulfur dioxide to formate ion is about 1.3–1.7, preferably 1.4, and of sulfur dioxide to sodium formate is about 1.45–1.95. On a weight basis, the sodium carbonate is about 55 percent to 80 percent of the sodium formate, on an equivalence basis, the $Na_2CO_3/HCOONa$ ratio is about 0.7–1.0.

On a sulfur dioxide basis by weight, the efficiency is about 74–82 percent. On a sodium formate basis by weight, the efficiency is about 65–70 percent. On a sodium basis by weight, the efficiency is about 65–75 percent. On a basis of reactor volume, this process produces about 2.2 to 2.8 pounds per gallon and about 0.6–0.7 pounds per hour per gallon as its productivity. As an average of numerous runs, the molar efficiencies are 77.4% based on $SO_2$, 67.3% based on $HCOONa$, and 73.6% based on $Na_2CO_3$. It has particularly been ascertained that if all of the alkali metal compound or all of the sodium formate is added at once, the dust value and/or the yield are adversely affected.

With respect to formate ion, it is important to note that a comparative calculation of prior art results for $Na_2O$, on the basis of alkaline Na versus total Na added, can be misleading for those examples (such as Example 4 in U.S. Pat. No. 3,897,544) wherein no caustic soda is added, all sodium being supplied by sodium formate. The reason therefor is that the process cannot be continued with recycled alcohol. To explain, the desired reaction requires one mol of formic acid and two mols of bisulfite:

$$HCOOH + 2NaHSO_3 \rightarrow Na_2S_2O_4 + CO_2 + 2H_2O$$

When one adds $SO_2$ to aqueous sodium formate as in Example 4 of U.S. Pat. No. 3,897,544, one produces two mols of formic acid for two mols of $NaHSO_3$:

$$2H_2O + 2SO_2 + 2HCOONa \rightarrow 2HCOOH + 2NaHSO_3$$

The extra formic acid must react with excess methanol to produce methyl formate. Otherwise, the excess formic acid would cause the hydrosulfite to decompose. The problem occurs when the methanol is recovered for the next batch. It will now contain much methyl formate, and could result in a run with severe decomposition if used according to Example 4 of U.S. Pat. No. 3,897,544 because of an excess of formic acid produced, which cannot be converted to methyl formate due to the latter already being present.

DESCRIPTION OF THE INVENTION

Investigation of the feasibility of substituting sodium carbonate for sodium hydroxide in the commercialized process as disclosed in U.S. Pat. No. 3,887,695 (modified by using temperatures lower than 160° C. for convenience) proceeded by making a direct substitution of an amount of $Na_2CO_3$ equivalent to the NaOH while maintaining the same amount of water, including the chemically bound water in the NaOH. Undesirable amounts of dust were obtained and the product was of lower purity. Next, the amount of soda ash was reduced, all other variables being constant. This improved the purity of assay of the product and lowered the dust.

In one set of experiments, dust was reduced from 350 to 307 by adding 45 g. less $Na_2CO_3$ and was further reduced to 215 by a five-minute delay in feeding the $Na_2CO_3$, but the most effective variable for decreasing dust was found to be the $SO_2$ "split" as shown by the following results for another set of experiments:

| Split | Dust Number |
|---|---|
| 81/19 | 260 |
| 82/18 | 196 |
| 83/17 | 147 |
| 84/16 | 97 |

The dustiness of production batches of sodium dithionite is checked with a colorimetric analytical method that uses a rubine solution to measure the sodium dithionite dust in a sample. In this method, 0.0256 grams $Na_2S_2O_4$ react with and decolorize 25 milliliters of rubine solution for determining the dust rating of each production batch.

A dustometer apparatus is assembled for carrying out this dust rating procedure. A carefully cleaned and dried elutriator tube, one inch in internal diameter and 34 inches in length and having a ball joint at each end thereof, is mounted in upright position. A carefully cleaned and dried elutriator sample container tube, one inch in internal diameter and 8 inches in length, with a layer of glass wool about 1 inch thick packed into the bottom thereof, is connected in upright position to the bottom of the elutriator tube. A nitrogen source at 5–10 psig is connected through a needle control valve and a rotameter to the bottom of the sample container tube. A J-shaped lead-off tube of 4–5 mm internal diameter is connected in inverted position to the upper ball joint of the elutriator tube, the straight side of the "J" extending to within one inch of the bottom of a 500 ml graduated cylinder containing 450 ml of water. A vibrator bar is attached to the curved portion of the "J" and connected through a variac to a source of power. A 50 ml burette containing the rubine solution is mounted above the top of the graduated cylinder.

To begin the test, a bottle containing a portion of a production batch is thoroughly mixed by gently rolling and tumbling the bottle (when the contents of the bottle are shaken, the dust cloud that settles on the top interferes with reproducibility of the test). A 50± 0.1 gram sample is removed from the bottle and carefully poured into the elutriator sample tube, care being exercised to prevent the loss of dust during the transfer and camel's hair brush being used to transfer all particles into the sample container tube.

3.0 ml of rubine solution are added to the water in the graduated cylinder. The vibration is started and adjusted by having the vibrator bar striking sharply against the underside of the J-shaped lead-off tube in the proximate center of the arc. When the buzzer is operating properly and suitably controlled by the variac, the operator can feel the vibrations when he places a finger on the tube about 3 or 4 inches from the point where the vibrator bar strikes it. If the apparatus is clamped too firmly, the vibrations are dampened and ineffective for dislodging the dust that settles out and within the lead-off tube.

The needle valve which controls the nitrogen flow through the elutriator column is opened carefully and rapidly and adjusted to a flow rate of 0.09425 cubic feet per minute. This flow rate is held constant throughout the run. As soon as the nitrogen flow into the bottom of the elutriator column and through the sodium dithionite sample is high enough to form a dust cloud, a timer is started.

At the instant that the rubine solution is decolorized, another few milliliters of rubine solution are added. The number of milliliters of rubine solution are noted at one-minute intervals. The elutriator running is continued for approximately 5 minutes (± one-half minute). The volume of rubine solution is determined to the nearest milliliter, and the time is determined to the nearest 0.1 minute.

The dust index or dust rating is calculated as follows:

$$\frac{\text{Milliliters of rubine solution}}{\text{Elapsed minutes}} \times 30 = \text{dust number}$$

In general, $SO_2$ addition is divided into two portions. The "fast" $SO_2$, comprising 80–85% of the total, is fed during the first 80 minutes; "slow" $SO_2$, comprising the remainder, is fed during the second 80 minutes; and the reaction is allowed to "cook", with no additional feed being added other than the "scrub" alcohol to prevent loss of volatile reactants, during the third 80 minutes.

Next, the extra water and methanol associated with the use of NaOH were reduced, and, finally, the amounts of reactants were scaled up to utilize the full volume of reactor and to obtain maximum productivity per unit of available volumetric capacity. The laboratory and pilot plant experimental data for $Na_2CO_3$ are presented in Examples 2, 3, 4, 6 and 7 and compared with Examples 1 and 5 for NaOH and with 15 examples for NaOH and $Na_2CO_3$ in the prior art.

The formulations in the examples given hereinafter, in which sodium formate is balanced with either NaOH or $Na_2CO_3$, are based on the assumption that the methanol, containing methyl formate, will be recovered from a previous run so that the methyl formate which is added is neither consumed nor produced. The examples thus simulate normal commercial production in which the methyl alcohol is recycled over and over.

In virgin batches such as the demonstrative examples of the prior art, in which caustic soda is used, methyl formate is not fed. Formate ion must consequently be supplied entirely from HCOONa, and NaOH must be correspondingly reduced.

As a result of this, the recycle formulations in the following examples cannot be literally compared with the virgin formulations of the prior art examples. For this reason, comparisons are hereinafter made on a basis of total sodium use.

In contrast to prior art experimentation with $Na_2CO_3$ in the reduction of sulfur dioxide with formate ion in aqueous methanolic solution to produce anhydrous sodium dithionite, these results indicate that: (1) an optimum ratio of reactants and an optimum experimental procedure have been discovered for using sodium carbonate as the source of a substantial amount of added alkali and (2) such conditions have been combined with the high reactant concentrations of U.S. Pat. No. 3,887,695 to attain at least its optimum productivity without using its inconveniently highest dissolving temperature.

The invention attains this result by supplying the alkali metal compound in as high a concentration as possible, preferably as a dry powder, by minimizing the amount of water, which acts as the solvent for the alkali metal compound and for the alkali metal formate, and by using as low a ratio as possible of methanol to water, so that the alkali metal compound is added in excess of its solubility in the water.

This invention is an improvement in the process for the reduction of sulfur dioxide with formate ion in aqueous methanolic solution to produce anhydrous sodium dithionite by introducing an aqueous sodium formate solution, a sulfur dioxide-methanol solution, and a selected sodium compound into a reactor to form a reaction mixture wherein, on an additive basis:

(a) the methanol-to-water weight ratio is 3.0–5.2;
(b) the $SO_2$-to-water weight ratio is 1.7–2.4; and
(c) the ratio of equivalents of $SO_2$ to equivalents of sodium formate is 1.45–1.95.

In a highly preferred embodiment this process may be summarized as comprising the following steps:

(A) dissolving sodium formate in water at elevated temperatures and up to maximum concentration to form an aqueous formate solution;
(B) dissolving sulfur dioxide in methanol;

(C) providing a recipient or puddle methanol solution within a fixedvolume reactor and gradually adding thereto:

(1) sodium carbonate, preferably as a dry powder, according to a first specific schedule to provide at least a substantial proportion of the alkali needed for the reaction, this sodium carbonate being 55–80% by weight of the sodium formate when used as 100% of the needed alkali and being in excess of its solubility in the water;

(2) the aqueous formate solution according to a second specific schedule, and (3) the $SO_2$-methanol solution according to a third specific schedule in which about 80% is added as a "fast" $SO_2$ feed, the remainder as a "slow" $SO_2$ feed at progressively slower addition rates.

The first and second specific schedules comprise the addition of all of the sodium formate solution and all of the sodium carbonate powder within no less than about 60–80 minutes; in the third specific schedule, the fast $SO_2$ feed occurs during about the first 60–80 minutes and the slow $SO_2$ feed occurs during about the next 80 minutes.

DESCRIPTION OF THE PREFERRED EMBODIMENT

EXAMPLES 1–4

Data and results for Examples 1–4 are listed in Table I. Example 1 presents the average for seven runs using caustic soda at 99% purity in a 73% solution and no sodium carbonate, according to a standard laboratory procedure with laboratory scale equipment, using the process described in U.S. Pat. No. 3,887,695. Example 2 presents the results for an equivalent amount of sodium carbonate and the same amount of water as in Example 1. Example 3 gives results for a lesser quantity of sodium carbonate and the same amount of water as in Example 2. Example 4 presents results for a still lesser amount of sodium carbonate and decreased amounts of both water and methanol.

As a typical procedure, Example 2 was prepared according to the following detailed steps:

To a stirred reactor is added 851 g. of methanol plus 38 g. of methyl formate. This charge is heated to 70° C. and maintained under a pressure of 35 psig with nitrogen. A mixture of 828 g. of 96% sodium formate is mixed with 727 g. water and heated to the boiling point. The mixture is transferred to a stainless steel cylinder, which is jacketed with 70 psig steam to maintain the solution at about 300° F. (150° C.).

The level in the feeder is measured by a float to which is attached a metal rod which protrudes from the top of the cylinder into a sight glass. The sight glass is calibrated in millimeters, so that the volume in the feeder is known with a good degree of accuracy. The feed rate is controlled by reading the feeder level every millimeter and comparing this with the calculated value.

A mixture of 1702 g. methanol, 76 g. methyl formate, and 1307 g. of sulfur dioxide is placed in another stainless steel cylinder equipped with a sight glass and meter stick, which also enables the volume to be known with good accuracy. The feed rate of the mixture is controlled by a rotameter.

Five hundred and fifty-seven grams of sodium carbonate are weighed into five beakers of 100 g. each plus one beaker of 57 g. The feeding mechanism for soda ash consists of two valves and a small hopper. The hopper easily holds 100 g.

TABLE I

| | Laboratory Scale Dithionite Preparations | | | |
|---|---|---|---|---|
| Example No. | 1 | 2 | 3 | 4 |
| NaOH, g.* | 424 | — | — | — |
| $H_2O$, g. | 155 | — | — | — |
| $Na_2CO_3$, g. | — | 557 | 517 | 501 |
| HCOONa (96%), g. | 787 | 828 | 828 | 819 |
| $H_2O$, g. | 455 | 727 | 727 | 595 |
| $CH_3OH$, g. | 1702 | 1702 | 1702 | 1206 |
| $HCOOCH_3$, g. | 76 | 76 | 76 | 76 |
| $SO_2$, g. | 1282 | 1307 | 1282 | 1263 |
| $CH_3OH$ (puddle), g. | 851 | 851 | 851 | 851 |
| $HCOOCH_3$ (puddle), g. | 38 | 38 | 38 | 38 |
| HCOONa (puddle), g. | 41 | — | — | — |
| $H_2O$ (puddle), g. | 22 | — | — | — |
| $CH_3OH$ (scrub), g. | 450 | 500 | 450 | 450 |
| $Na_2S_2O_4$, g. | 1429 | 1462 | 1416 | 1432 |
| Assay, % | 90.9 | 89.8 | 91.6 | 90.9 |
| Pure $Na_2S_2O_4$, g. | 1299 | 1313 | 1297 | 1301 |
| Dust No. | 175 | 453 | 97 | 238 |
| Total Na equivalents | 22.775 | 22.341 | 21.931 | 21.496 |
| Total formate equivalents | 14.073 | 14.073 | 14.073 | 13.94 |
| Total $SO_2$ equivalents | 20.012 | 20.401 | 20.012 | 19.716 |
| Total $CH_3OH$ equivalents | 95.625 | 97.210 | 95.625 | 80.144 |

*99% purity, 73% solution

The space between the valve holds 11.1 g. Since 557 g. are to be fed over 79 minutes, 7.05 g. should be fed per minute. At 11.1 g. per dump, the valve system should be operated over every 1.57 minutes. A bleed of nitrogen is maintained at the soda ash inlet to prevent condensation from the reaction plugging the inlet. (In later experiments, the nitrogen bleed was omitted, and the valve and fittings heated with electrical tape to prevent condensation.)

With the reactor contents at 70° C., the $SO_2$-methanol feed is started. After the $SO_2$ concentration in the pot has reached 1% (by calculation), the timer is started and the feeds of sodium formate solution and solid soda ash begun. Five percent of the sodium formate solution is fed in the first minute, and the remaining 95% fed over 79 minutes. The soda ash is fed over 79 minutes. Eighty-one percent of the $SO_2$-methanol is fed over 80 minutes as a "fast $SO_2$" feed rate, and the remaining 19% fed over the following 80 minutes at progressively slower rates. At the end of 80 minutes, the $SO_2$-methanol feed rate is reduced to about ⅓ that of the fast $SO_2$ feed rate, and this flow rate is maintained for 20 minutes. The rate is then reduced to 26% of the fast $SO_2$ feed rate for another 15 minutes and finally to 17% of the fast rate until the $SO_2$-methanol solution runs out, which is generally at 160 minutes.

The reaction temperature, which is at 70° C. at the start, is allowed to reach 83° C. after about 5 minutes. A temperature of 83° C. is maintained thereafter until the end of the run.

After the slow $SO_2$ feed is finished (at about 160 minutes), the run is allowed to "cook" for another 80 minutes, or until a total of 240 minutes of run time.

During the entire run, a feed of 500 g. of methanol is fed to the scrubber to lessen the loss of volatile reactants such as methyl formate and $SO_2$.

Samples are taken of the reaction filtrate after the fast $SO_2$ feed (80 minutes), after the slow $SO_2$ feed (160 minutes), and at the end of the run (240 minutes). A ten ml sample is mixed with an alkaline formaldehyde solution (to tie up bisulfite) and is then titrated with 0.1 N standard iodide solution. This "titer" is a measure of the sodium thiosulfate content of the solution and is therefore an indication of the extent of decomposition of hydrosulfite.

The contents of the reactor are filtered through a glass-fritted Buchner funnel, maintaining an atmosphere of nitrogen above the product to prevent contact with air. The product is washed with methanol and dried in a vacuum flask, under vacuum while heated in a hot water bath. The dried product is weighed to determine the yield, assayed for hydrosulfite purity, and a dust number is run plus a screen analysis.

EXAMPLES 5-7

Data and results for Examples 5-7 are listed in Table II which shows pilot plant results for a standard run using sodium hydroxide and for two runs using sodium carbonate. The reactor is equipped and operated as described in U.S. Pat. No. 3,887,695. The sodium carbonate is 63% by weight of the sodium formate. In Example 6, the amount of methanol is the same as in Example 5, but the amount of water that is present has been slightly increased. In Example 7, the amount of water has been reduced by 25% and the amount of methanol has been reduced by 20% with respect to Example 6.

TABLE II

| | Pilot Plant Dithionite Preparations | | |
|---|---|---|---|
| Example No. | 5 | 6 | 7 |
| NaOH, parts | 71 | — | — |
| $Na_2CO_3$, parts | — | 83 | 83 |
| $H_2O$, parts | 98 | 116 | 87 |
| HCOONa, parts | 138 | 138 | 138 |
| $CH_3OH$, parts | 501 | 501 | 400 |
| $HCOOCH_3$, parts | 18 | 18 | 18 |
| $SO_2$, parts | 211.2 | 205.2 | 205.2 |
| $Na_2S_2O_4$ (gross basis) | 246 | 239 | 247.5 |
| $Na_2S_2O_4$ (100% basis) | 226 | 222 | 228.7 |
| Assay, % | 92 | 92.7 | 92.4 |
| Dust No. | 100 | 206 | 102 |
| Total Reaction Time, Hrs. | 4.0 | 4.0 | 4.0 |
| Total Na equivalents | 3.704 | 3.514 | 3.514 |
| Total formate equivalents | 2.247 | 2.247 | 2.247 |
| Total $SO_2$ equivalents | 3.30 | 3.206 | 3.206 |
| Total $CH_3OH$ equivalents | 15.937 | 15.937 | 12.784 |
| Productivity, pounds/hr./gal. | 0.57 | 0.57 | 0.68 |

EXAMPLES 8-10

Additional pilot plant results are presented in Table III for a standard run with caustic soda (Example 8) and for two runs (Examples 9 and 10) with soda ash in which the $Na_2CO_3$ is 62.9 percent by weight of the HCOONa. Significantly improved productivities, measured as pounds of pure $Na_2S_2O_4$ per gallon of reactor volume, were obtained in Examples 9 and 10 which are essentially scale-ups of Example 7. Even though the amount of water which was used for dissolving the increased amount of sodium formate was slightly greater than the total amount of water used in Example 8 with the NaOH and with the HCOONa, the substitution of $Na_2CO_3$ for NaOH enabled the methanol to be reduced even though additional sulfur dioxide was used. Because of the relatively low density of methanol, this reduction saved considerable valuable space in the reactor.

In general, use of sodium carbonate as the principle source of supply for alkali in the process of this invention, as demonstrated in Examples 8-10, enables less solvent and larger quantities of reactants to be used in a reactor so that productivity is significantly increased as compared with the productivities usually obtained with sodium hydroxide as the principle source of supply for alkali.

Although the Examples, as presented in Tables I–III, are directed towards the use of soda ash as a solid, it is to be understood that this invention encompasses the addition of water to soda ash with a corresponding reduction of water in other feed streams. The key to the inventive contribution resides in: (a) the total water added to the reactor and (b) maintaining the methanol-to-water ratios previously set forth, and not necessarily in the amount of water in an individual feed stream.

TABLE III

| | Pilot Plant Dithionite Preparations | | | |
|---|---|---|---|---|
| Example No. | 8 | 9 | 10 | 11 |
| $Na_2CO_3$, lb fed | — | 100 | 100 | 108 |
| NaOH, lb fed* | 70 | — | — | — |
| HCOONa, lb fed** | 132.5 | 159 | 159 | 152 |
| $SO_2$, lb fed | 211.2 | 243.2 | 243.2 | 248 |
| $CH_3OH$, lb fed | 501 | 483 | 483 | 473 |
| (Initial Puddle) | (142) | (164) | (164) | (150) |
| (With $SO_2$) | (284) | (244) | (244) | (248) |
| (Scrub) | (75) | (75) | (75) | (75) |
| $H_2O$, lb fed | 100 | 104 | 104 | 110 |
| (With NaOH) | (26) | — | — | — |
| (With HCOONa) | (74) | (104) | (104) | (110) |
| $HCOOCH_3$ | 18 | 16 | 16 | 40 |
| Total Vol., gal | 100 | 100 | 100 | 100 |
| Filtrate Vol. gal | 87 | 84 | 84 | 84 |
| Product, lb | 247 | 302 | 296 | 287 |
| Product, % $Na_2S_2O_4$ | 91.5 | 90.3 | 90.3 | 90.1 |
| Pure $Na_2S_2O_4$, lb | 226 | 273 | 267 | 258.6 |
| Efficiencty: $SO_2$ Basis, % | 78.7 | 82.5 | 80.8 | 76.7 |
| Formate Basis, % | 66.6 | 67.0 | 65.7 | 66.6 |
| Sodium Basis, % | 70.2 | 74.2 | 72.7 | 73.0 |
| Productivity (lb/gal/hr) | 0.57 | 0.68 | 0.68 | 0.65 |

*100% pure
**100% pure

Indeed, it is perfectly feasible to dissolve all or a portion of the soda ash in all of the water or to dissolve neither soda ash nor sodium formate in any of the water but to add both reagents as dry streams to a puddle solution containing all of the water or to add the water as a separate stream in proportional combination with either or both dry streams.

Comparative Ratios and Productivity Calculations For Laboratory And Pilot Plant Examples And For Prior Art Examples In Tables IV and V, calculated ratios, based on equivalence values in Tables I and II, and calculated yields, based on $SO_2$, formate ion, and sodium ion, are also given for both experimental runs and prior art examples. Finally, calculated productivity in terms of reactor volume as pounds of Na$_2$S$_2$O$_4$ per hour per gallon are listed for one example in each of four prior art patents. In general, productivity increased 18 percent by laboratory data and 20 percent by pilot plant data.

Referring to Table IV, Examples 5 and 8 illustrate the usual caustic runs made by the modified process of U.S. Pat. No. 3,887,695 in which sufficient water is added to avoid having to use very hot water (160° C.) for dissolving all of the caustic soda. Example 6 is a substitution of soda ash for caustic, while using the same quantity of methanol as in the caustic runs plus more water so that there is no increase in productivity. Example 7 reduces the methanol by 20 percent and the water by 11 percent over the corresponding caustic run and produces slightly more product. However, because less Na$_2$O is added along with less water, there is no discernible difference in the Na$_2$O/H$_2$O ratios between Examples 7 and 5; yet there is a difference in the Na$_2$O/methanol ratios because the methanol is reduced more than the Na$_2$O.

The desirable ratio range of Na$_2$CO$_3$/HCOONa is 0.55–0.80. At a ratio of 0.65 in similar pilot plant runs, 3.2 pounds of extra Na$_2$CO$_3$ lower the assay from 92.7 percent to 91.7 percent; at a ratio of 0.70, 9.8 pounds of extra Na$_2$CO$_3$ lower the assay to 89.2 percent.

If less sodium formate is used, there is less buffering power and the potential for an unsaturated filtrate which would lead to dissolving dithionite and decomposition thereof. However, extra Na$_2$S$_2$O$_5$ can be substituted in the filtrate for some of the sodium formate.

During most of the reaction in the reaction mixture, formic acid is converted to methyl formate according to the following series of reactions:

$$Na_2CO_3 + 2SO_2 \rightarrow Na_2S_2O_5 + CO_2$$

$$2SO_2 + 2HCOONa + H_2O \rightarrow Na_2S_2O_5 + 2HCOOH$$

$$HCOOH + Na_2S_2O_5 \rightarrow Na_2S_2O_4 + H_2O + CO_2$$

$$HCOOH + CH_3OH \rightleftharpoons HCOOCH_3 + H_2O$$

TABLE IV

| Example No. | 1 | 2 | 3 | 4 | 5 | 6 | 7 | 8 | 9 | 10 | 11 |
|---|---|---|---|---|---|---|---|---|---|---|---|
| Sodium Equiv./SO$_2$ Equiv. | 1.086 | 1.089 | 1.071 | 1.065 | 1.160 | 1.127 | 1.127 | 1.121 | 1.113 | 1.113 | 1.102 |
| Sodium Equiv./Formate Equiv.* | 1.618 | 1.612 | 1.558 | 1.542 | 1.648 | 1.564 | 1.564 | 1.648 | 1.626 | 1.626 | 1.914 |
| Wt. CH$_3$OH/Wt. H$_2$O | 4.842 | 4.283 | 4.209 | 4.310 | 5.204 | 4.396 | 4.702 | 5.110 | 4.371 | 4.731 | 4.30 |
| SO$_2$ Equiv./CH$_3$OH Equiv.** | 0.209 | 0.206 | 0.209 | 0.246 | 0.207 | 0.202 | 0.252 | 0.207 | 0.215 | 0.215 | 0.262 |
| Wt. SO$_2$/Wt. H$_2$O | 2.027 | 1.797 | 1.762 | 2.121 | 2.161 | 1.774 | 2.366 | 2.112 | 2.338 | 2.338 | 2.255 |
| SO$_2$ Equiv./Formate Equiv.* | 1.422 | 1.422 | 1.422 | 1.414 | 1.473 | 1.431 | 1.431 | 1.467 | 1.461 | 1.461 | 1.337 |
| Efficiency: SO$_2$ Basis, % | 74.6 | 74.0 | 74.4 | 75.8 | 78.7 | 79.5 | 81.9 | 78.7 | 82.6 | 80.8 | 76.8 |
| Formate* Basis, % | 67.1 | 64.5 | 63.7 | 64.7 | 64.0 | 62.8 | 64.8 | 66.6 | 67.1 | 65.6 | 66.6 |
| Sodium Basis, % | 65.5 | 67.5 | 67.9 | 69.5 | 70.1 | 72.6 | 74.8 | 70.4 | 74.2 | 72.6 | 69.4 |
| Productivity (lbs/hr/gal) | 0.49 | 0.49 | 0.49 | 0.57 | 0.49 | 0.49 | 0.57 | 0.57 | 0.68 | 0.68 | 0.65 |

*Includes formate equivalents in sodium formate and methyl formate.
**Includes methanol equivalents in methyl formate.

TABLE V

| Pat. No./Run | U.S. Pat. No. 3,411,875 | | | | U.S. Pat. No. 3,714,340 | | | |
|---|---|---|---|---|---|---|---|---|
|  | Ex.1 | Ex.2 | Ex.3 | Ex.4 | Ex.1 | Ex.2 | Ex.3 | Ex.4 |
| NaOH, parts | 23 | 21 | 20 | 30 | 23.2 | 30.0 | 23.2 | 23.2 |
| Na$_2$CO$_3$, parts | — | — | — | — | — | — | — | — |
| H$_2$O, parts | 200 | 240 | 136 | 100 | 108.8 | 98 | 100 | 133.7 |
| HCOONa, parts | 80 | 90 | 70 | 75 | 108 | 77.6 | 108 | 90 |
| CH$_3$OH, parts | 470 | 500 | 386 | 424 | 326.3 | 425 | 325 | 401.3 |
| HCOOCH$_3$, parts | — | — | — | — | — | — | — | — |
| SO$_2$, parts | 80 | 87 | 72 | 100 | 103.4 | 100 | 103.4 | 98.2 |
| Na$_2$S$_2$O$_4$ (100% basis) | 76.0 | 78.3 | 64.1 | 94.2 | 110.4 | 100.0 | 110.0 | 86.9 |
| Assay, % | 90.5 | 91.2 | 89.0 | 90.6 | 92.5 | 92.0 | 92.3 | 91.0 |
| Dust No. | — | — | — | — | — | — | — | — |
| Temp. Range ° C | 60.70 | 70 | 70 | 70 | 70–82 | 70–82 | 70–82 | 70 |
| Total Reaction Time, Hrs. | 4.8 | 5.3 | 5.0 | 5.3 | 5.5 | 4.5 | 4.0 | 6.0 |
| Productivity (lbs./hr./gal.) | — | — | — | 0.191 | 0.215 | — | 0.293 | — |
| Total Na equivalents | 1.751 | 1.848 | 1.529 | 1.853 | 2.168 | 1.891 | 2.168 | 1.903 |
| Total formate equivalents | 1.176 | 1.323 | 1.029 | 1.103 | 1.588 | 1.141 | 1.588 | 1.323 |
| Total SO$_2$ equivalents | 1.249 | 1.358 | 1.124 | 1.561 | 1.614 | 1.561 | 1.614 | 1.533 |
| Total CH$_3$OH equivalents | 14.669 | 15.605 | 12.047 | 13.233 | 10.184 | 13.265 | 10.456 | 12.525 |
| Na eq./SO$_2$ eq. | 1.402 | 1.361 | 1.360 | 1.187 | 1.343 | 1.211 | 1.343 | 1.241 |
| Na eq./formate eq. | 1.489 | 1.397 | 1.486 | 1.680 | 1.365 | 1.657 | 1.365 | 1.438 |
| Wt. CH$_3$OH/wt. H$_2$O | 2.347 | 2.081 | 2.835 | 4.235 | 2.995 | 4.331 | 3.346 | 2.998 |
| SO$_2$ eq./CH$_3$OH eq. | 0.085 | 0.087 | 0.093 | 0.118 | 0.158 | 0.118 | 0.154 | 0.122 |
| Wt. SO$_2$/Wt. H$_2$O | 0.399 | 0.362 | 0.529 | 0.999 | 0.949 | 1.019 | 1.033 | 0.734 |
| SO$_2$ eq./formate eq. | 1.062 | 1.026 | 1.092 | 1.415 | 1.016 | 1.368 | 1.016 | 1.159 |
| Yields: | | | | | | | | |
| SO$_2$ Basis | 70.0 | 66.3 | 65.5 | 69.3 | 78.6 | 73.7 | 78.3 | 65.1 |
| Formate Basis | 37.2 | 34.0 | 35.8 | 49.0 | 39.9 | 50.4 | 39.8 | 37.7 |
| Sodium Basis | 49.9 | 48.7 | 48.1 | 58.4 | 58.4 | 60.8 | 58.3 | 52.4 |

TABLE V-continued

| | No. 3,887,695 | | U.S. Pat. No. 3,897,544 | | | | |
|---|---|---|---|---|---|---|---|
| Pat. No./Run | Ex.1 | Ex.2 | Ex.1 | Ex.2 | Ex.3 | Ex.4 | Ex.5 |
| NaOH, parts | 550 | 650 | 28 | 32 | — | — | 28 |
| $Na_2CO_3$, parts | — | — | — | — | 28 | — | — |
| $H_2O$, parts | 880 | 880 | 150 | 125 | 120 | 120 | 130 |
| HCOONa, parts | 1360 | 1190 | 100 | 117 | 78 | 131 | 100 |
| $CH_3OH$, parts | 3800 | 3650 | 450 | 375 | 480 | 480 | 390 |
| $HCOOCH_3$, parts | — | 150 | — | — | — | — | — |
| $SO_2$, parts | 1920 | 1920 | 110 | 128 | 85 | 85 | 110 |
| $Na_2S_2O_4$ (100% basis) | 2087.5 | 2083.8 | 101.9 | 117.9 | 74.8 | 72.8 | 97.9 |
| Assay, % | 92.0 | 92 | 91 | 90 | 86 | 91 | 89 |
| Dust No. | — | — | — | — | — | — | — |
| Temp. Range °C. | 83 | 83 | 72 | 74 | 71 | — | — |
| Total Reaction Time, Hrs. | 4.0 | 4.0 | 7.0 | 8.0 | 7.0 | 8.0 | 7.0 |
| Productivity (lbs./hr./gal.) | — | 0.65 | — | 0.158 | — | — | — |
| Total Na equivalents | 33.747 | 33.747 | 2.17 | 2.52 | 1.675 | 1.926 | 2.17 |
| Total formate equivalents | 19.997 | 19.995 | 1.470 | 1.720 | 1.147 | 1.926 | 1.470 |
| Total $SO_2$ equivalents | 29.972 | 29.972 | 1.717 | 1.998 | 1.327 | 1.327 | 1.717 |
| Total $CH_3OH$ equivalents | 118.602 | 116.418 | 14.045 | 11.704 | 14.981 | 14.981 | 12.172 |
| Na eq./$SO_2$ eq. | 1.126 | 1.126 | 1.264 | 1.261 | 1.262 | 1.451 | 1.264 |
| Na eq./formate eq. | 1.688 | 1.688 | 1.476 | 1.465 | 1.460 | 1.00 | 1.476 |
| Wt. $CH_3OH$/wt. $H_2O$ | 4.313 | 4.233 | 2.996 | 2.996 | 3.995 | 3.995 | 2.996 |
| $SO_2$ eq./$CH_3OH$ eq. | 0.253 | 0.257 | 0.122 | 0.171 | 0.089 | 0.089 | 0.141 |
| Wt. $SO_2$/Wt. $H_2O$ | 2.180 | 2.180 | 0.733 | 1.023 | 0.708 | 0.708 | 0.845 |
| $SO_2$ eq./formate eq. | 1.499 | 1.499 | 1.168 | 1.162 | 1.157 | 0.689 | 1.168 |
| Yields: | | | | | | | |
| $SO_2$ Basis | 80.0 | 79.9 | 68.3 | 67.9 | 64.8 | 63.0 | 65.6 |
| Formate Basis | 60.0 | 59.9 | 39.9 | 39.4 | 37.5 | 21.7 | 38.3 |
| Sodium Basis | 71.1 | 70.9 | 54.0 | 53.8 | 51.3 | 43.4 | 51.9 |

The first of these reactions is slower in the reaction mixture of this invention than in its caustic counterpart, as in U.S. Pat. No. 3,887,695, because sodium carbonate is less soluble in the aqueous methanol solvent than sodium hydroxide so that more $SO_2$ reacts according to the second reaction. In consequence, excess formic acid is consumed according to the fourth reaction.

This reaction is minimized by recycling methyl formate from a previous batch with the recovered methanol so that the equilibrium tends to be shifted to the left. The hydrolysis reaction is very slow, and there is not a large conversion although the reaction does occur to some extent during the last stage of the reaction after all materials have been added.

By comparing the results reviewed hereinbefore with the data in the prior art, it is clear that where sodium carbonate is the alkali source at relatively low concentrations (e.g., 25% or less) with respect to water added, the yield and productivity are low but where sodium carbonate has been used at high concentrations (e.g., 42%–49% solutions with respect to total water added), the yields and productivity are strikingly high.

In practice, the equilibrium concentration of methyl formate in the reaction mixture to which sodium carbonate is added in more than twice that of the reaction mixture to which caustic soda is added. Another consequence of the slower dissolving capability of sodium carbonate is that excess sulfur dioxide can readily exist and reacts with dissolved sodium formate to produce formic acid and sodium bisulfite:

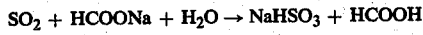

$$SO_2 + HCOONa + H_2O \rightarrow NaHSO_3 + HCOOH$$

EXAMPLE 12

As an illustration of the test reactions which were made to establish that initial addition of all of the alkali metal compound or all of the sodium formate would adversely affect yield and/or dust value, sodium hydroxide was used as the alkali compound in Example 12, which was as similar as possible to Example 1. A laboratory reactor was charged with:

424 g. NaOH (solid beads)
851 g. $CH_3OH$
38 g. $HCO_2CH_3$
41 g. $HCO_2Na$
22 g. $H_2O$ to form the initial puddle.

A solution of 787 g. of sodium formate (96 percent assay) and 610 g. of water was fed into the reactor over an 80-minute period. Simultaneously, the reactor was being fed with 81 percent of a solution consisting of 1702 g. methanol, 76 g. methyl formate and 1282 g. sulfur dioxide as the "fast" $SO_2$. The remainder of the latter solution was then charged during the next 80 minutes as the "slow" $SO_2$ to provide an 81/19 split of the $SO_2$-methanol material, to obtain optimum dust values (minimum dust production). As a scrub, 450 grams of methanol were used.

The dried product was 922 grams of impure $Na_2S_2O_4$ having an assay of 77.3%, equalling 713 grams of pure sodium dithionite.

In Example 1, exactly the same procedure was used except that the 73 percent solution of NaOH was fed over a 60-minute period, simultaneously with the addition of the sodium formate solution. Of major interest is the very low yield and low purity of the product for Example 12 as compared to Example 1.

It is accordingly highly preferred that the $SO_2$-methanol solution, the aqueous methanol solution, and the powdered sodium carbonate are added to the methanol puddle solution, containing an equilibrium amount of about 4% to 8% methyl formate by weight, according to specific schedules which are proportioned to the rate of solution of sodium carbonate in the aqueous methanol solvent and to the rates of reaction of sulfur dioxide with sodium carbonate and sodium formate to form sodium metabisulfite.

Methanol seems to have the excellent ability to dissolve the reactant salts, $Na_2S_2O_5$ and HCOONa. Ethanol will work, but it is borderline because as water is formed during the reaction, a second liquid phase, rich in water, is produced. The presence of this second phase causes immediate decomposition of sodium dithionite if ethanol and water are the sole solvents. Accordingly, it is preferred to use a mixture of methanol and ethanol that does not result in forming a second liquid phase that is rich in water. Other solvents, such as isopropanol and n-methyl-pyrrolidone, are also suitable in minor admixture with methanol.

The methanol-to-water ratio is a useful criterion for the reactant concentrations according to the process of this invention. In Table V, the water in this ratio refers to that fed to the reactor, not the water present in the reaction which includes the water produced in the process.

Water present may be estimated as follows with reference to Example 4 of Table III, in which water added is 595 grams. Methanol added is $1206 + 851 + 450 = 2507$ grams. Methanol-to-water-fed is 4.21. Water produced is estimated from the moles of formic acid generated which is in turn equal to moles of $SO_2$ added minus moles of NaOH equivalent. This calculation is 1263/64 minus $(2 \times 501/106) = 10.28$ moles HCOOH = moles $H_2O/2 = 92.5$ grams. Total water is therefore 687.5 grams, and the methanol-to-water-present ratio is $2507/687.5 = 3.65$.

As has heretofore been stated, the novel process of this invention results in increased productivity for a given reaction vessel per unit of time. This increased productivity results from the fact that it is possible, using the teachings of this invention, to utilize more of the reactor volume for the production of sodium dithionite than has heretofore been possible.

The inventive concept disclosed herein involves the use of less water which in turn permits one to use less methanol while still keeping the proper range of water to methanol in the reactor. By the use of less methanol, there is more room in the reactor so that more product can be produced per batch.

Because it will be readily apparent to those skilled in the art that innumerable variations, modifications, applications, and extensions of the examples and principles hereinbefore set forth can be made without departing from the spirit and scope of the invention, what is herein defined as such scope and is desired to be protected should be measured, and the invention should be limited, only by the following claims.

I claim:

1. In a process for the production of anhydrous sodium dithionite by introducing an aqueous sodium formate solution, a sulfur dioxide-methanol solution, and an sodium compound into a reactor to form a reaction mixture wherein, on an additive basis:
   (a) the methanol-to-water weight ratio is about 3.0 to about 5.2;
   (b) the $SO_2$-to-water weight ratio is about 1.7 to about 2.4; and
   (c) the ratio of equivalents of $SO_2$ to equivalents of sodium formate is about 1.45 to about 1.95;

the improvement which comprises using an sodium carbonate as said sodium compound and adding the same directly to the reactor in an amount in excess of its solubility in said reaction mixture such that solid sodium carbonate is present in the reactor, allowing reaction of all reagents to occur, and recovering said anhydrous sodium dithionite from said reaction mixture.

2. The process of claim 1 wherein the sulfur dioxide methanol solution contains methyl formate.

3. The process of claim 2 wherein methyl alcohol and methyl formate are placed in said reactor prior to introducing said sulfur dioxide-methanol solution, said aqueous sodium formate, and said solid sodium carbonate.

4. The process of claim 3 wherein the addition of said sodium carbonate takes place during approximately the first 60 to 80 minutes of the time required for said reaction to produce said anhydrous sodium dithionite from said reaction mixture.

5. The process of claim 4 wherein about 5 percent of said aqueous sodium formate solution is added within approximately the first minute and the remaining 95 percent is added within the 60 to 80 minutes of the total reaction time necessary for said reaction to produce said sodium dithionite.

6. The process of claim 5 wherein 80–85 percent by weight of said sulfur dioxide-methanol solution is introduced into said reactor within the first 60–80 minutes of the total reaction time and the remaining 15–20 percent is introduced within the succeeding 80 minutes.

7. The process of claim 5 wherein said reaction mixture is at about 83° C. during said introducing of said sodium carbonate into said reactor.

8. The process of claim 6 wherein said reaction has a productivity of at least about 0.6 pounds of pure sodium dithionite per gallon of reactor volume per hour.

9. The process of claim 3 wherein the ratio of equivalents of $SO_2$ to equivalents of methanol is 0.20–0.30.

10. The process of claim 3 wherein the weight ratio of said sodium carbonate to said sodium formate is about 0.55 to about 0.8.

11. The process of claim 3 wherein the weight ratio of $SO_2$ to water is about 1.8 to about 2.2.

12. The process of claim 3 wherein the equivalence ratio of $SO_2/HCOO^-$ is about 1.3 to about 1.7.

13. In a process for the reduction of sulfur dioxide with formate ion in aqueous methanolic solution to produce anhydrous sodium dithionite by introducing an aqueous sodium formate solution, a sulfur dioxide-methanol solution, and a sodium compound into a reactor to form a reaction mixture wherein, on an additive basis:
   (a) the methanol-to-water weight ratio is about 3.0 to about 5.2;
   (b) the $SO_2$-to-water weight ratio is about 1.7 to about 2.4; and
   (c) the ratio of equivalents of $SO_2$ to equivalents of sodium formate is about 1.45 to about 1.95;

the improvement which comprises:
   (A) dissolving sodium formate in water at elevated temperatures and up to maximum concentration to form said aqueous formate solution;
   (B) dissolving sulfur dioxide in methanol to form said sulfur dioxide-methanol solution;
   (C) providing a puddle methanol solution within said reactor and adding thereto to form said reaction mixture:
      (1) sodium carbonate, as a dry powder, to provide at least a substantial proportion of the alkali needed for said reduction, said sodium carbonate being 55–80% by weight of said sodium formate when used as 100% of the needed alkali and being in excess of its solubility in said water at said elevated temperatures;

(2) said aqueous formate solution, and (3) said sulfur dioxide-methanol solution in which about 81% is added during the first 60 to 80 minutes, the remainder during the next 80 minutes at progressively slower addition rates;

(D) allowing reaction of all reagents in said reaction mixture to occur within up to about four hours; and (E) recovering said anhydrous sodium dithionite from said reaction mixture.

14. The improved process of claim 13 wherein the addition of said aqueous formate solution consists of adding 5% of said aqueous sodium formate solution at a concentration of about 50–65% by weight during the first minute and the remaining 95% during the subsequent 59–79 minutes.

15. The improved process of claim 14 wherein the addition of said sodium carbonate consists of adding about 1.70% to about 1.27% by weight of said dry sodium carbonate per minute to said reactor during said subsequent 59–79 minutes.

16. The improved process of claim 15 wherein said methanol contains about 4% to about 8% methyl formate.

* * * * *